United States Patent
Ramsl

(10) Patent No.: US 12,223,278 B2
(45) Date of Patent: Feb. 11, 2025

(54) AUTOMATIC DATA CARD GENERATION

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 17/860,912

(22) Filed: Jul. 8, 2022

(65) Prior Publication Data

US 2024/0013004 A1  Jan. 11, 2024

(51) Int. Cl.
*G06F 40/30* (2020.01)
*G06F 16/2458* (2019.01)
*G06F 16/31* (2019.01)

(52) U.S. Cl.
CPC .......... *G06F 40/30* (2020.01); *G06F 16/2458* (2019.01); *G06F 16/31* (2019.01)

(58) Field of Classification Search
CPC ...... G06F 40/30; G06F 16/2458; G06F 16/31; G06F 16/906; G06F 16/148; G06F 16/25; G06F 16/245; G06F 3/04842; G06F 9/451; G06N 5/04
See application file for complete search history.

(56) References Cited

U.S. PATENT DOCUMENTS

| | | | | |
|---|---|---|---|---|
| 10,210,551 B1 * | 2/2019 | Todd | ......................... | G06F 16/25 |
| 11,263,391 B2 * | 3/2022 | Potts | ................... | G06F 3/04842 |
| 11,675,808 B2 * | 6/2023 | Jacob | ..................... | G06F 16/245 707/756 |
| 11,734,937 B1 * | 8/2023 | Pushkin | ............... | G06F 18/2155 706/12 |
| 11,755,602 B2 * | 9/2023 | Smith | ....................... | G06N 5/04 707/770 |
| 11,837,000 B1 | 12/2023 | Ramsl | | |
| 11,947,529 B2 * | 4/2024 | Gasper | ................... | G06F 16/906 |
| 12,008,050 B2 * | 6/2024 | Brener | ..................... | G06F 9/451 |
| 2014/0293366 A1 | 10/2014 | Ozawa | | |
| 2015/0003666 A1 | 1/2015 | Wang et al. | | |

(Continued)

OTHER PUBLICATIONS

"Bipartite graph", Wkipedia, [Online]. Retrieved from the Internet: <URL: https://en.wikipedia.org/wiki/Bipartite_graph>, (Accessed Jun. 23, 2022), 10 pgs.

(Continued)

*Primary Examiner* — Paras D Shah
*Assistant Examiner* — Nadira Sultana
(74) *Attorney, Agent, or Firm* — SCHWEGMAN LUNDBERG & WOESSNER, P.C.

(57) ABSTRACT

Example methods and systems are directed to automatic data card generation for datasets. A data card is a summary that describes quantitative aspects of a dataset, qualitative aspects of a dataset, or both. The data samples and documentation of a dataset are analyzed automatically to determine a number of samples, a primary data type, a license, or any suitable combination thereof. Data formats for data and documentation of the dataset may be automatically recognized. Language of text data may be automatically recognized. The most frequent language for the text data may be identified as the primary language of the dataset. A data card may be created for the dataset. The data card may indicate the number of samples, the data formats used in the data set, the language of text data in the dataset, or any suitable combination thereof.

17 Claims, 9 Drawing Sheets

(56) References Cited

U.S. PATENT DOCUMENTS

| | | |
|---|---|---|
| 2015/0278593 A1 | 10/2015 | Panferov et al. |
| 2015/0379343 A1 | 12/2015 | Powell et al. |
| 2017/0039253 A1 | 2/2017 | Bond |
| 2017/0371970 A1 | 12/2017 | Bharti et al. |
| 2018/0165289 A1 | 6/2018 | Ramsl et al. |
| 2018/0288079 A1 | 10/2018 | Muddu et al. |
| 2019/0018904 A1 | 1/2019 | Russell et al. |
| 2019/0065877 A1 | 2/2019 | Kalyuzhny et al. |
| 2019/0244094 A1 | 8/2019 | Ramsl |
| 2020/0134420 A1 | 4/2020 | Spooner |
| 2020/0293276 A1 | 9/2020 | Ballinger et al. |
| 2020/0380274 A1 | 12/2020 | Shin et al. |
| 2021/0224403 A1 | 7/2021 | Amthor |
| 2021/0232579 A1 | 7/2021 | Schechter et al. |
| 2021/0287048 A1* | 9/2021 | Walters .................. G06N 3/084 |
| 2021/0342399 A1 | 11/2021 | Sisto et al. |
| 2021/0365807 A1 | 11/2021 | Ramsl |
| 2022/0129498 A1 | 4/2022 | Kilaru et al. |
| 2022/0171008 A1 | 6/2022 | Zeller |
| 2023/0004977 A1 | 1/2023 | Cepek et al. |
| 2023/0062307 A1 | 3/2023 | Ramsl |
| 2023/0096118 A1 | 3/2023 | Ramsl |
| 2023/0162257 A1 | 5/2023 | Bhagat et al. |
| 2023/0186020 A1* | 6/2023 | Rayles .................. G06F 16/148 704/9 |
| 2024/0012936 A1 | 1/2024 | Ramsl |
| 2024/0028646 A1 | 1/2024 | Ramsl |

OTHER PUBLICATIONS

Guo, Qingyu, et al., "A Survey on Knowledge Graph-Based Recommender Systems", arXiv:2003.00911v1, (Feb. 28, 2020), 17 pgs.

Karani, Dhruvil, "Introduction to Word Embedding and Word2Vec", Published in Towards Data Science, [Online]. Retrieved from the Internet: <URL: https://towardsdatascience.com/introduction-to-word-embedding-and-word2vec-652d0c2060fa>, (Sep. 1, 2018), 8 pgs.

Lopez, Frederico, et al., "Augmenting the User-Item Graph with Textual Similarity Models", arXiv:2109.09358v1, (Sep. 20, 2021), 12 pgs.

U.S. Appl. No. 17/746,451, filed May 17, 2022, OCR Using 3-Dimensional Interpolation.

"U.S. Appl. No. 17/746,451, Notice of Allowance mailed Oct. 12, 2023", 9 pgs.

"U.S. Appl. No. 17/870,565, Examiner Interview Summary mailed Apr. 2, 2024", 3 pgs.

"U.S. Appl. No. 17/870,565, Examiner Interview Summary mailed Dec. 8, 2023", 3 pgs.

"U.S. Appl. No. 17/870,565, Final Office Action mailed Feb. 26, 2024", 20 pgs.

"U.S. Appl. No. 17/870,565, Non Final Office Action mailed Jul. 16, 2024", 21 pgs.

"U.S. Appl. No. 17/870,565, Non Final Office Action mailed Oct. 19, 2023", 19 pgs.

"U.S. Appl. No. 17/870,565, Response filed Apr. 9, 2024 to Final Office Action mailed Feb. 26, 2024", 13 pgs.

"U.S. Appl. No. 17/870,565, Response filed Dec. 14, 2023 to Non Final Office Action mailed Oct. 19, 2023", 15 pgs.

Ozuysal, Mustafa, et al., "Fast Keypoint Recognition using Random Ferns", IEEE Transactions on Pattern Analysis and Machine Intelligence, vol. 32, (2010), 14 pgs.

"U.S. Appl. No. 17/870,565, Response filed Aug. 23, 2024 to Non Final Office Action mailed Jul. 16, 2024", 18 pgs.

"U.S. Appl. No. 17/862,091, Non Final Office Action mailed Sep. 9, 2024", 11 pgs.

"U.S. Appl. No. 17/862,091, Examiner Interview Summary mailed Oct. 22, 2024", 2 pgs.

"U.S. Appl. No. 17/870,565, Final Office Action mailed Nov. 13, 2024", 34 pgs.

"U.S. Appl. No. 17/862,091, Response filed Oct. 23, 2024 to Non Final Office Action mailed Sep. 9, 2024", 11 pgs.

* cited by examiner

FIRST DATASET TABLE

| SAMPLE ID | SAMPLE |
|---|---|
| 1 | THIS IS A SENTENCE. |
| 2 | THIS IS ANOTHER SENTENCE. |
| 3 | ESTA FRASE ESTA EN ESPAÑOL. |

SECOND DATASET TABLE

| SAMPLE ID | SAMPLE |
|---|---|
| 1 | ESTA FRASE ESTA EN ESPAÑOL. |
| 2 | ESTA ES OTRA FRASE. |
| 3 | THIS IS A SENTENCE. |

THIRD DATASET TABLE

| SAMPLE ID | SAMPLE |
|---|---|
| 1 | /FILES/3/ERSTE.JPG |
| 2 | /FILES/3/ZWEITE.GIF |
| 3 | /FILES/3/DRITTE.JPG |

DATA CARD TABLE

| DATASET ID | PRIMARY DATA TYPE | NO. OF ENTRIES | PRIMARY LANGUAGE | TRAINING SET SIZE | TESTING SET SIZE |
|---|---|---|---|---|---|
| 1 | TEXT | 1000 | ENGLISH | 800 | 200 |
| 2 | TEXT | 1000 | SPANISH | 800 | 200 |
| 3 | IMAGE | 10000 | GERMAN | 7500 | 2500 |

*FIG. 5*

AUTOMATIC DATA CARD GENERATION

TECHNICAL FIELD

The subject matter disclosed herein generally relates to machine learning datasets, and, more specifically, to automatic generation of data cards.

BACKGROUND

Machine learning datasets are often not well documented and lack metadata regarding what is contained in the dataset. Individuals seeking to identify datasets for training machine learning models rely on experience rather than documentation.

BRIEF DESCRIPTION OF THE DRAWINGS

FIG. 5 is a block diagram of an example database schema suitable for storing datasets and data cards.

DETAILED DESCRIPTION

Figure 1:
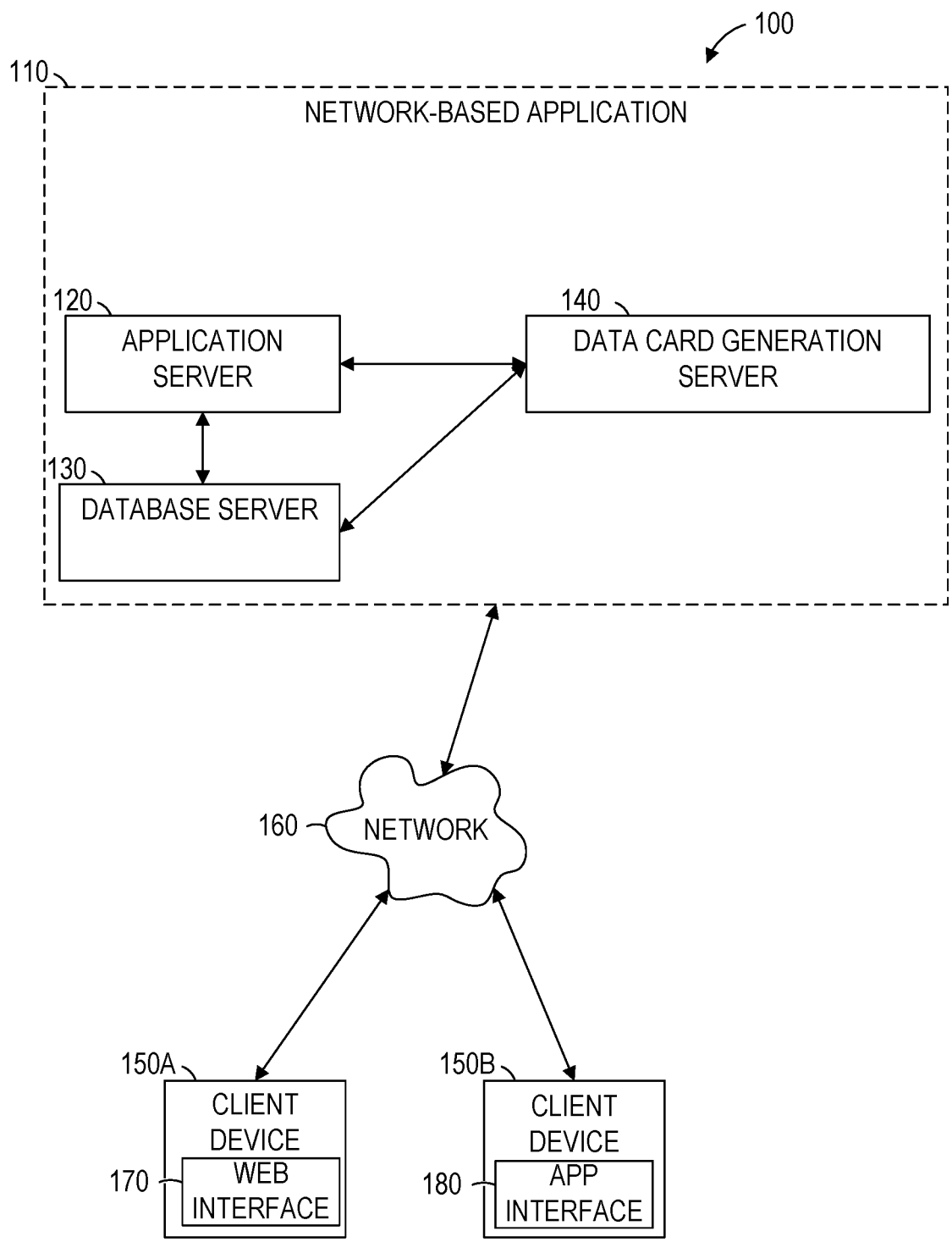
FIG. 1 is a network diagram illustrating an example network environment suitable for automatic data card generation.

Example methods and systems are directed to automatic data card generation for datasets. Existing systems store datasets with manually created data cards comprising metadata that describes each dataset. The data cards may contain different information and be in different formats. The data cards may be stored separately from the corresponding datasets, such that some users have access to the datasets without the corresponding data cards.

A data card is a summary that describes quantitative aspects of a dataset, qualitative aspects of a dataset, or both. Quantitative aspects of a dataset are measured aspects of the dataset and include statistics such as the number of items in the dataset, the resolution of images in a dataset, the size of images in a dataset, the language of text in the dataset, the number of characters, line, or pages of text in the dataset, or any suitable combination thereof. Qualitative aspects of a dataset are descriptive aspects of the dataset and include an intended use of the dataset, a license for the dataset, a dataset collection method, a stratification method, or any suitable combination thereof.

For a given dataset, the data samples are analyzed automatically to determine a number of samples, a primary data type, a license, or any suitable combination thereof. Analysis of the dataset may comprise analyzing data of the dataset or analyzing documentation of the dataset. For example, a number of image files may be counted to determine a number of image samples in the data set or text of documentation of the dataset may be searched for keywords relating to the number of samples to determine the number of image samples.

Data formats for data and documentation of the dataset may be automatically recognized. Example data formats include JavaScript Object Notation (JSON), Extended Markup Language (XML), markdown (md), text (txt), Microsoft Word Document (docx), graphics interchange format (GIF), joint photographic experts group (JPEG), and the like.

Language of text data may be automatically recognized. For example, each line of text data may be processed by one or more machine-learning models to determine the language of the text (e.g., Spanish, German, English, Chinese, French, or Hebrew). The most frequent language for the text data may be identified as the primary language of the dataset.

A data card may be created for the dataset. The data card may indicate the number of samples, the data formats used in the data set, the language of text data in the dataset, or any suitable combination thereof.

When these effects are considered in aggregate, one or more of the methodologies described herein may obviate a need for certain efforts or resources that otherwise would be involved in generating data cards for datasets. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for automatic data card generation. The network environment 100 includes a network-based application 110, client devices 150A and 150B, and a network 160. The network-based application 110 is provided by an application server 120 in communication with a database server 130 and a data card generation server 140. The application server 120 accesses application data (e.g., application data stored by the database server 130) to provide one or more applications to the client devices 150A and 150B via a web interface 170 or an application interface 180.

The application server 120, the database server 130, the data card generation server 140, and the client devices 150A and 150B may each be implemented in a computer system, in whole or in part, as described below with respect to FIG. 9. The client devices 150A and 150B may be referred to collectively as client devices 150 or generically as a client device 150.

The data card generation server 140 accesses datasets from the database server 130, the application server 120, or the client devices 150. For example, the application server 120 may provide machine-learning functionality, such as the generation of trained machine-learning models based on parameters received from a client device 150 and a dataset accessed from the database server 130. The application server 120 may cause a user interface to be presented on a client device 150 for selection of a dataset from multiple available datasets (e.g., by generating a hypertext markup language (HTML) page to be rendered by the web interface 170). The user interface may include some or all information from corresponding data cards. Thus, the user interface is enhanced when the data cards contain more information about the corresponding datasets.

The data card generation server 140 may generate or supplement data cards for the datasets. For example, a dataset may be analyzed to determine a number of samples, a type of data, a primary language, a license for use, an intended type of machine-learning model to be trained, or any suitable combination thereof. The resulting metadata describing the dataset may be stored in the database server 130 and accessed by the application server 120 or the client devices 150.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the data card generation server 140, and the client devices 150A-150B are connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
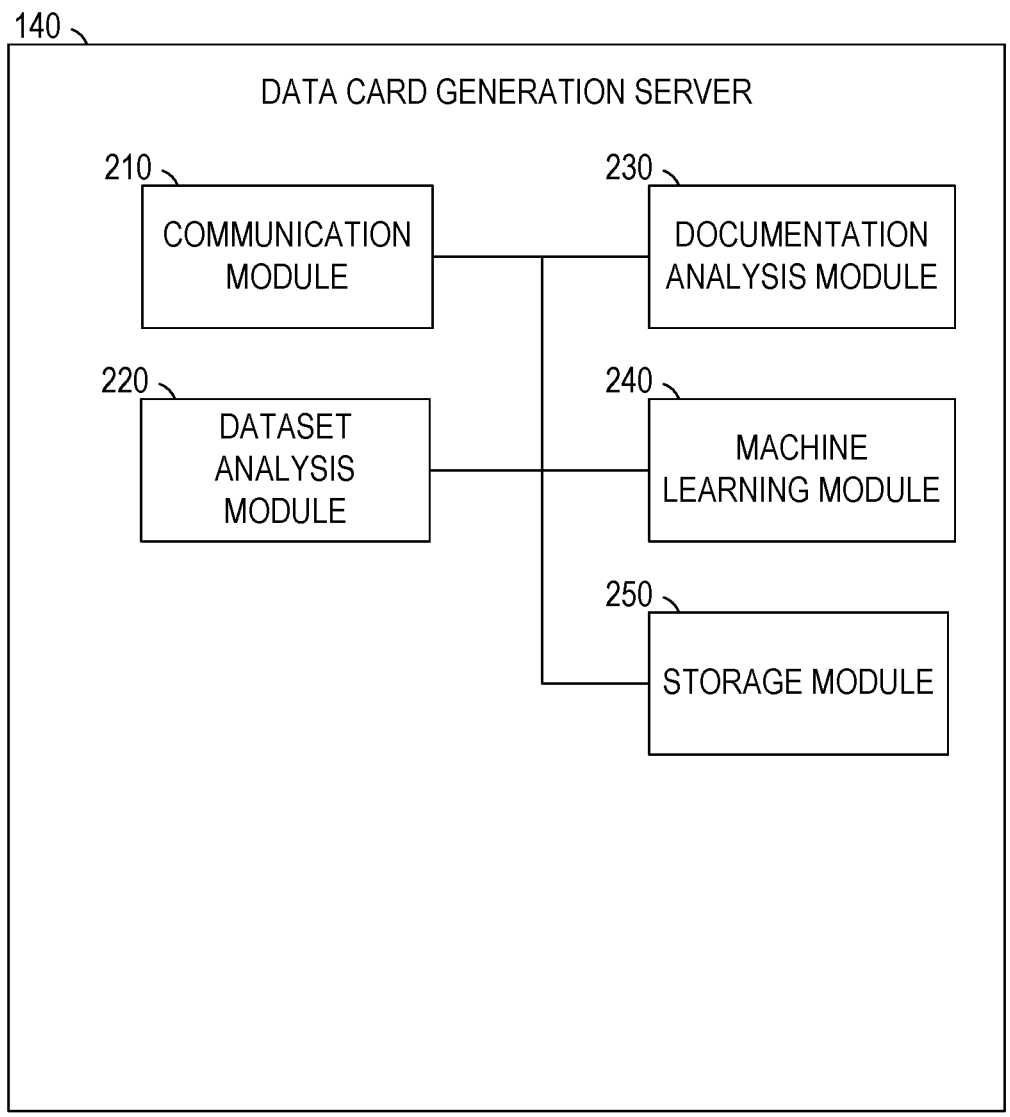
FIG. 2 is a block diagram of an example data card generation server, suitable for automatically generating data cards for datasets.

FIG. 2 is a block diagram of an example data card generation server 140, suitable for automatically generating data cards for datasets. The data card generation server 140 is shown as including a communication module 210, a dataset analysis module 220, a documentation analysis module 230, a machine-learning module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the data card generation server 140 and transmits data from the data card generation server 140. For example, the communication module 210 may receive, from the application server 120, an identifier of a dataset for which to generate a data card. As another example, the communication module 210 may receive, from the database server 130, the dataset itself. Communications sent and received by the communication module 210 may be intermediated by the network 160.

The dataset analysis module 220 analyses a dataset to determine properties of the dataset. For example, a number of files comprising the dataset may be counted, the types of the files identified, the contents of image files analyzed to identify items depicted in the images, the contents of text files analyzed to identify languages of text, the contents of text files analyzed to identify meaning of text, or any suitable combination thereof. The determined properties of the dataset may be added to a data card for the dataset.

The documentation for the dataset is analyzed by the documentation analysis module 230. For example, one or more documents (e.g., README.txt) may be included with the dataset to describe the dataset. The documents may be searched for keyword strings to identify text indicating a number of samples in the dataset, a type of samples in the dataset, an intended use for the dataset, a license governing usage of the dataset, or any suitable combination thereof. The properties of the dataset determined by analysis of the documentation may be added to the data card for the dataset.

The documentation for the dataset may be identified based on the filenames of the documentation within a folder containing the dataset. For example, a dataset may be identified by a name of a file in a file system. The folder may contain a plurality of image files and a README file (e.g., a README.md file, a README.rst file, a README.txt file, or another file with a predetermined name). Based on the name of the README file matching a predetermined name (or one of a plurality of predetermined names), the README file is identified as containing documentation for the dataset. The dataset may be identified by a name of a folder in a file system. For example, the folder may contain an images sub-folder and a documentation (or doc) sub-folder. Based on the names of the sub-folders matching predetermined names, the images sub-folder may be treated as containing images of the dataset and the documentation sub-folder may be treated as containing documentation for the dataset.

Machine-learning models may be trained or used by the machine-learning module 240. For example, a trained machine-learning module may be used to identify the content of image samples, to identify the meaning of text files, to determine file types, to identify the language of text, or any suitable combination thereof. Additionally, machine-learning models may be trained using datasets. The machine-learning models, datasets, data cards, or any suitable combination thereof may be stored and accessed by the storage module 250. For example, local storage of the data card generation server 140, such as a hard drive, may be used. As another example, network storage may be accessed by the storage module 250 via the network 160.

Figure 3:
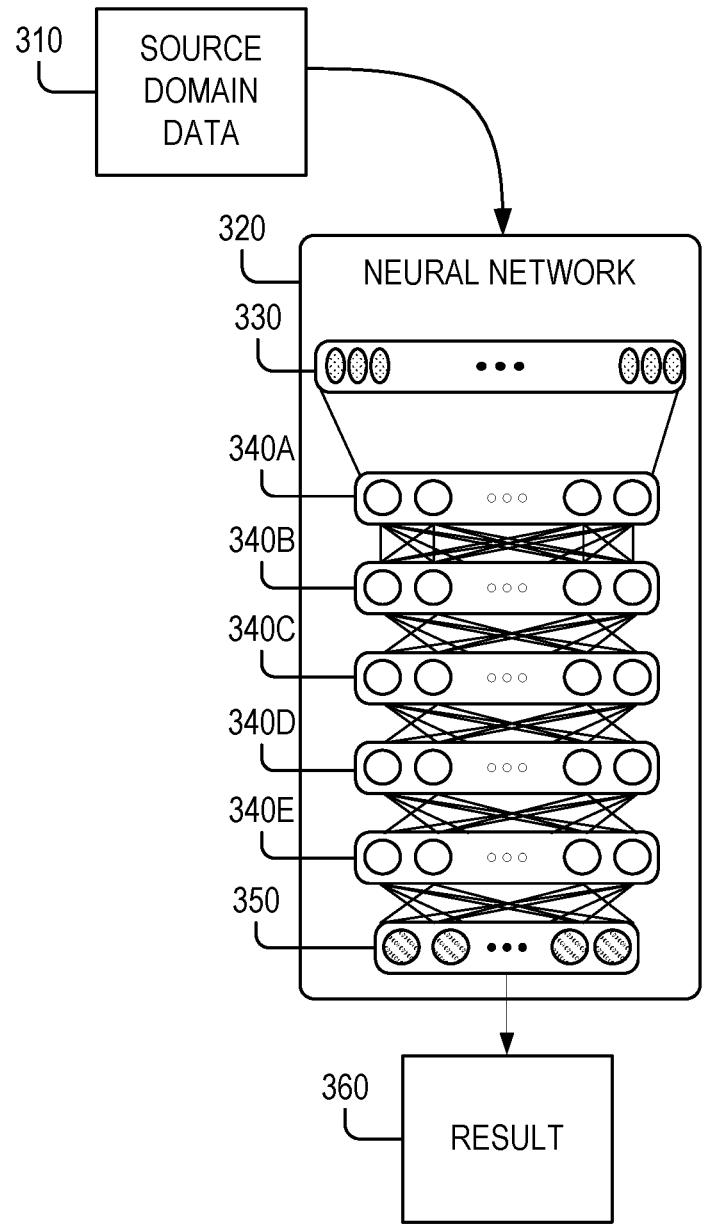
FIG. 3 is a block diagram of an example neural network, suitable for machine learning for automatic data card generation.

FIG. 3 is a block diagram of an example neural network 320, suitable for machine learning for automatic data card generation. The neural network 320 takes source domain data 310 as input and processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between one and the size of the training dataset while the number of epochs is any positive integer value. The model parameters are updated after each batch (e.g., using gradient descent).

In a supervised learning phase, a model is developed to predict the output for a given set of inputs and is evaluated over several epochs to more reliably provide the output that is specified as corresponding to the given input for the greatest number of inputs for the training dataset. The training dataset comprises input examples with labeled outputs. For example, a user may label images based on their content and the labeled images may be used to train an image identifying a model to generate the same labels.

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

To more closely map to a desired result, each model develops a rule or algorithm over several epochs by varying the values of one or more variables affecting the inputs. However, since the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task that the algorithm is trying to learn. These input-weight products are summed and the sum is passed through what is called a node's activation function to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like.

Figure 4:
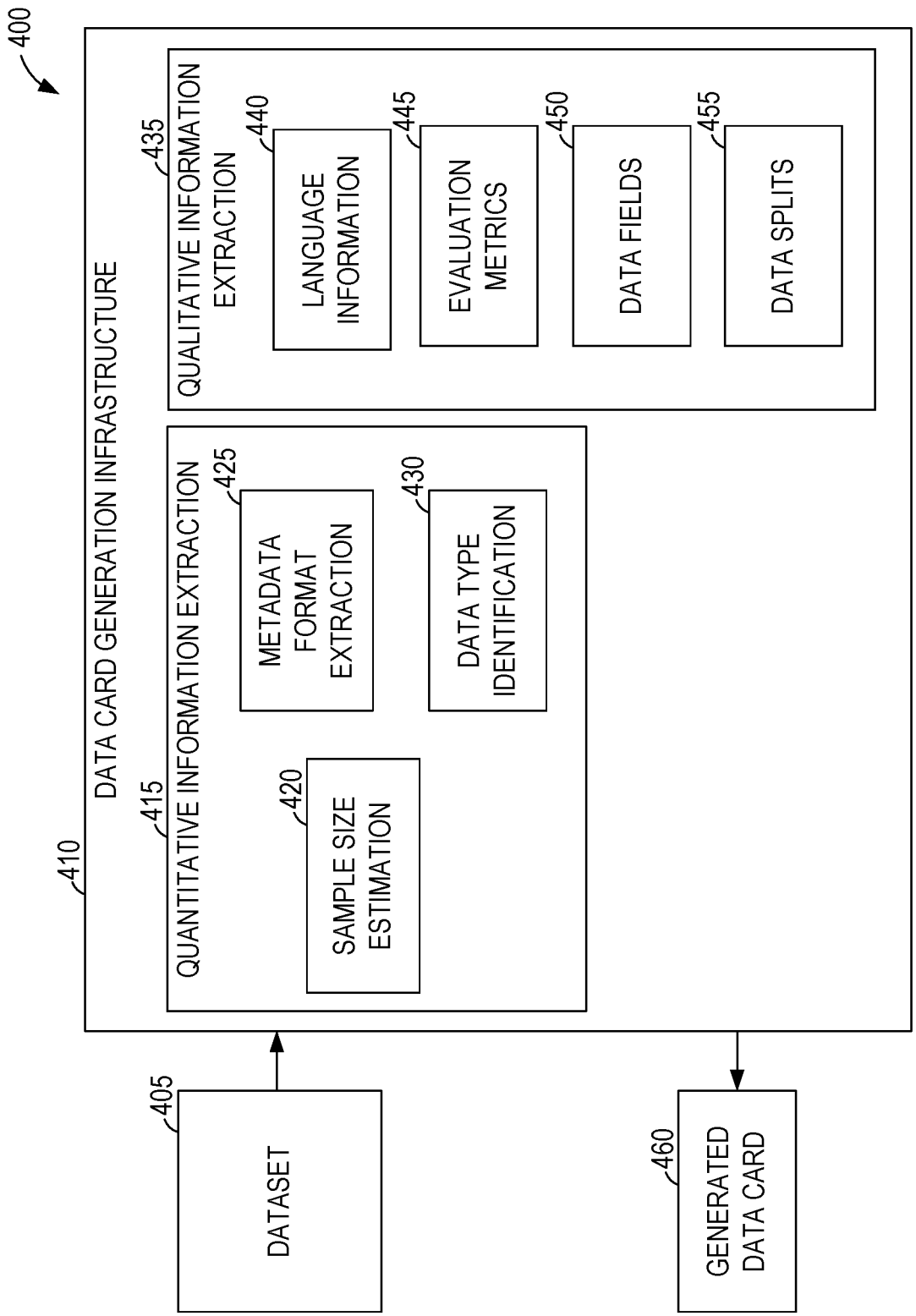
FIG. 4 is a block diagram of example data card generation infrastructure, suitable for generating a data card for a dataset.

FIG. 4 is a block diagram 400 of example data card generation infrastructure 410, suitable for generating a data card for a dataset. The block diagram 400 includes a dataset 405, the data card generation infrastructure 410, and a generated data card 460. The data card generation infrastructure 410 includes a quantitative information extraction module 415 and a qualitative information extraction module 435. The quantitative information extraction module 415 includes a sample size estimation module 420, a metadata format extraction module 425, and a data type indication module 430. The qualitative information extraction module 435 includes a language information module 440, an evaluation metrics module 445, a data fields module 450, and a data splits module 455.

The quantitative information extraction module 415 analyzes the dataset 405 to obtain quantitative information about the dataset 405. The quantitative information includes a number of samples, a metadata format, a primary data type, or any suitable combination thereof. For example, the sample size estimation module 420 may determine what defines the dimensions of the data elements in the dataset. For example, each data element may be contained in a separate file, a row in one or more text files, a row in one or more database tables, a word in one or more text files, or any suitable combination thereof. Based on the determined dimensions of the data elements, the number of samples in the dataset 405 is estimated. Multiple candidates for the number of samples may be generated based on different possible dimensions.

Text in documentation for the dataset 405 may also be analyzed to identify a number of samples declared in the documentation. For example, all documentation files for the dataset 405 may be searched for a predetermined phrase (e.g., "number of entries") and nearby text indicating a number used as the source of the number of samples declared in the documentation. Other words that may be searched for to identify the number of samples include examples, entries, instances, and rows. The number of samples declared in the documentation may be compared to the candidates for the number of samples to determine the closest match. The closest matching value determined from the data of the dataset 405 or the number of samples declared in the documentation may be used as the number of samples for the generated data card 460.

Thus, one or more processors of the data card generation server 140 may determine a number of entries in a dataset by analysis of the dataset. The one or more processors may access a data value representing the number of entries in the documentation, compare the determined number of entries with the accessed number of entries, and, if the values match, store the matching number of entries in the generated data card 460.

The metadata format extraction module 425 may recognize the format of metadata for the dataset 405. For example, compliance with language standards for JSON, XML, md, or Rich Text Format (RTF) may indicate that the metadata is in JSON, XML, md, or RTF format. Lack of compliance with the language standards but inclusion of a high percentage of human-readable characters may indicate that the metadata is in text format. The metadata format information may be added to the generated data card 460.

The data type indication module 430 may determine a primary data type of the dataset 405. For example, the files that form the dataset may be analyzed by recognizing unique characteristics of file types such as JPEG, Bitmap (BMP), GIF, Portable Network Graphics (PNG), md, RTF, text, Motion Pictures Experts Group (MPEG) 3 (mp3), MPEG 4 (mp4), Waveform Audio File (wav), Ogg Vorbis Compressed Audio File (OGG), QuickTime video (mov), or any suitable combination thereof. The primary data type is selected as the data type that occupies the greatest amount of the dataset 405 (measured in terms of the number of files or the amount of disk space used). For example, one or more processors of the data card generation server 140 may determine a file type for each of the plurality of files that comprise the dataset; determine, for each file type, a total size for the files of the file type; and select the primary data type based on the file type having the largest total size.

The primary data type may also be determined based on documentation for the dataset. For example, documentation may be searched for predetermined words such as image, text, video, tables, and audio. Based on finding a match for a predetermined word, the primary data type may be determined to be the found word, a synonym, or a data type mapped to the word.

The data types may be further categorized. For example, JPG, PNG, BMP, and GIF may be grouped together in an image category. Similarly, text, md, and RTF may be grouped together in a text category; MP3, wav, and OGG may be grouped together in an audio category; and MP4 and mov may be grouped together in a video category. The primary data type, the primary data category, or both may be added to the generated data card 460.

The dataset 405 is also processed by the qualitative information extraction module 435. For example, the language information module 440 may use the spacy-langdetect tool to detect languages for textual data. The dataset 405 may include multiple languages in a single document. Accordingly, the text may be processed line-by-line or sentence-by-sentence, allowing for a more fine-grained analysis. The most-represented language may be designated as the primary language of the dataset and added to the generated data card 460. Alternatively, all languages found in the dataset 405 may be indicated by the generated data card 460.

The determination of the primary language of the dataset may include determining a percentage of the dataset that comprises text in each of a plurality of languages and determining the primary language of the dataset based on the determined percentages. In example embodiments in which the text is processed line-by-line, the determination of the primary language of the dataset may include splitting each of a plurality of files of the dataset into lines, determining a language for each line, and determining the percentage of lines in each of the plurality of languages.

The evaluation metrics module 445 scans the documentation to identify metrics regarding the dataset 405. The identified metrics may be added to the generated data card 460. Example metrics include Pearson Correlation, Spearman's Rho, Root Mean Square Error (RMSE), precision, recall, F-score, BLEU, ROGUE, accuracy, sensitivity, and specificity.

The qualitative information extraction module 435 may also identify information regarding a license for use of the dataset. For example, the qualitative information extraction module 435 may scan the documentation for words such as "legal information," "IP," "intellectual property," "license," "usage," "terms," or other predetermined words or phrases. When a match is found, text near the match may be treated as license information for use of the data set.

Each dataset 405 has a particular structure. For each of the data types determined by the data type indication module 430, the fields are extracted by the data fields module 450. For example, directories in a file system can act as labels or categories for the files (e.g., text files, image files, audio files, video files, or any suitable combination thereof). For example, each folder may correspond to a data field. For structured text-based datasets, the fields are extracted. For example, in a comma-separated value (CSV) or spreadsheet data file, the first line may include identifiers of the data fields where each column or comma-separated value identifies the name of a particular field. The data fields determined by the data fields module 450 may be added to the generated data card 460.

The data splits module 455 identifies subsets in the dataset 405. For example, the dataset 405 may be split into a training set and a testing set. The documentation is analyzed for mentions of dataset splits. For example, the documentation may be searched for keywords such as "train," "test," "stratification," "splitting," "validation," "holdout," "hyperparameter," "accuracy," "sensitivity," "specificity," "overfitting," "cross-validation," or any suitable combination thereof. Alternatively, data fields may be stored in separate files (e.g., training.txt and validation.txt) or samples may be stored in separate directories (e.g., train/ and validate/). The identified subsets may be indicated by the generated data card 460.

Thus, by use of the data card generation infrastructure 410, the generated data card 460 is generated for the dataset 405. The generated data card includes information about quantitative features of the dataset 405, qualitative features of the dataset 405, or both. A user may review the generated data card 460 to learn about the dataset 405. The data card generation infrastructure 410 may be applied to multiple different datasets 405 to generate different generated data cards 460 in a standardized format. A user interface may be provided to allow the user to browse or search the generated data cards 460 and to access a corresponding dataset 405. As a result, the user may be enabled to more efficiently find a dataset that is useful for a particular purpose.

FIG. 5 is a block diagram of an example database schema 500 suitable for storing datasets and data cards. The database schema 500 includes a first dataset table 505, a second dataset table 520, a third dataset table 535, and a data card table 550. The first dataset table 505 includes rows 515A, 515B, and 515C in a format 510. The second dataset table 520 includes rows 530A, 530B, and 530C in a format 525. The third dataset table 535 includes rows 545A, 545B, and 545C in a format 540. The data card table 550 includes rows 560A, 560B, and 560C in a format 555.

The first dataset table 505, the second dataset table 520, and the third dataset table 535 store samples for three datasets. By way of example, only three rows are shown for each of the two dataset tables 505, 520, and 535, though typical datasets include hundreds or thousands of samples. The formats 510, 525, and 540 indicate that each row in the dataset tables 505, 520, and 535 includes a sample identifier and a sample. The samples for the first dataset table 505 and the second dataset table 520 are stored in the database. The samples for the third dataset table 535 are stored in a file system and the name of the file is stored in the database.

Each row 560A-560C of the data card table 550 stores a data card for a data set. In the example of FIG. 5, each data card includes a dataset identifier, a primary data type of the dataset, a number of entries in the dataset, a primary language of the dataset, and sizes of training and testing sets in the dataset. Thus, the row 560A indicates that the dataset with identifier 1 (corresponding, in this example, to the first dataset table 505) has a primary data type of text, 1000 total entries, a primary language of English, 800 entries in the training set, and 200 entries in the testing set. Similarly, the row 560B indicates that the dataset with identifier 2 (corresponding to the second dataset table 520) has identical characteristics except for a primary language of Spanish instead of English.

The row 560C of the data card table 550 indicates that dataset 3 has a primary data type of image, 10,000 entries, a primary language of German, and that 7,500 of the entries are in a training set and 2,500 of the entries are in a testing set.

Figure 6:
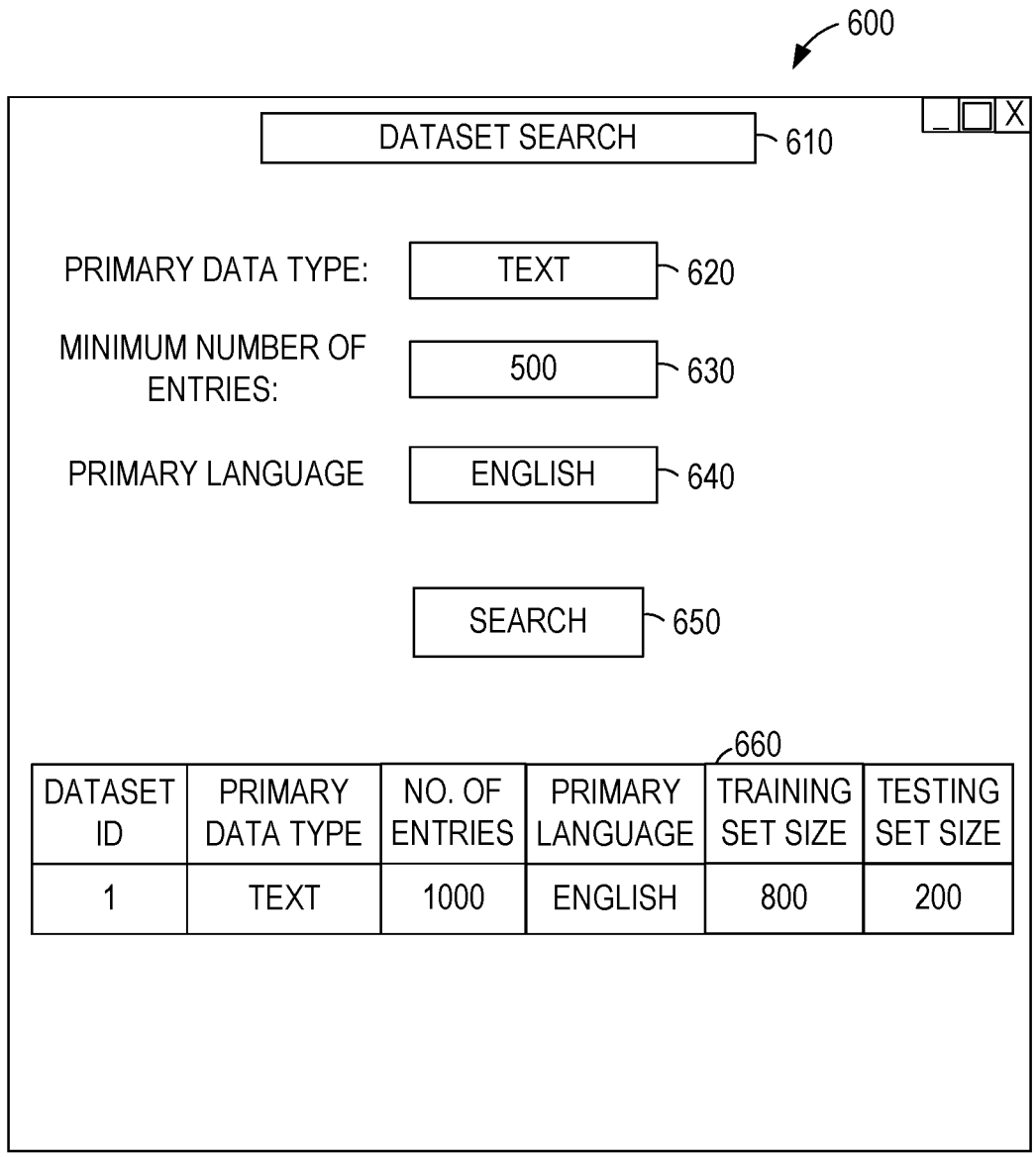
FIG. 6 is a block diagram of an example user interface suitable for searching for datasets and displaying data cards.

FIG. 6 is a block diagram of an example user interface 600 suitable for searching for datasets and displaying data cards. The user interface 600 includes a title 610, search fields 620, 630, and 640, a button 650, and results 660.

The title 610 indicates that the user interface 600 provides dataset search functionality. The search field 620 accepts a primary data type to be searched for (e.g., text or image). The search field 630 accepts a minimum number of entries. The search field 640 accepts a primary language. The search fields 620-640 may be implemented as text boxes, drop-down selectors, combo boxes, checkboxes, radio buttons, or any suitable combination thereof. More or fewer search fields may be shown.

The button 650 is operable to cause the application server 120 to search for datasets that match the criteria specified in the search fields 620-640. The results 660 show information about one or more datasets resulting from the search. For example, the data card table 550 of FIG. 5 may be searched to identify datasets with a primary data type of text, at least 500 entries, and a primary language of English. The data card for one or more matching datasets may be displayed in the results 660.

Thus, by use of the user interface 600, a user is enabled to access data cards generated by the data card generation server 140 to quickly and efficiently identify datasets that match user-identified criteria. As a result, both user and computing resources (e.g., processor cycles, memory consumption, network traffic) are saved.

Figure 7:
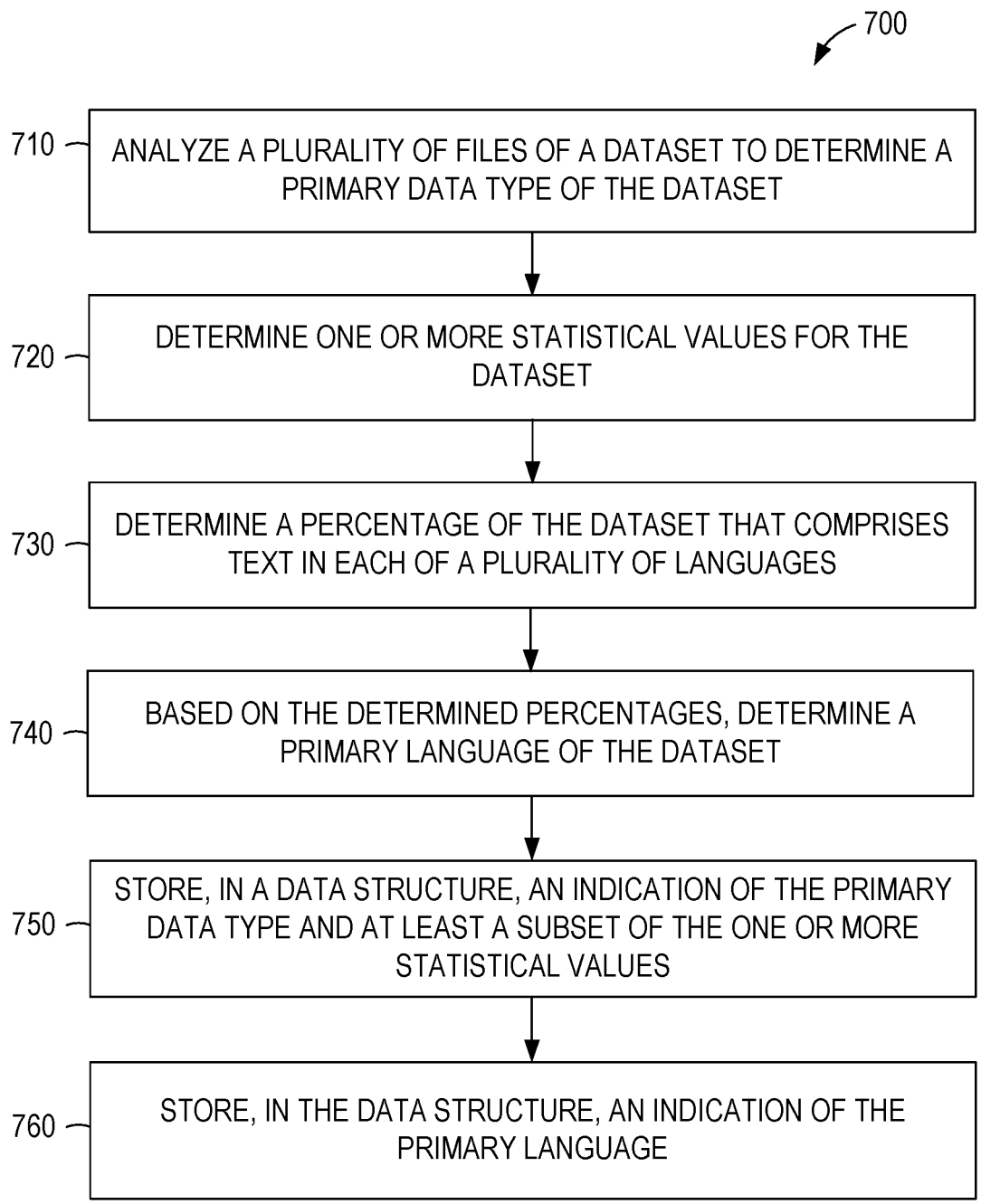
FIG. 7 is a flowchart illustrating operations of an example method suitable for automatic data card generation.

FIG. 7 is a flowchart illustrating operations of an example method 700 suitable for automatic data card generation. The method 700 includes operations 710, 720, 730, 740, 750, and 760. By way of example and not limitation, the method 700 is described as being performed by the data card generation server 140 of FIG. 1, using the modules of FIG. 2, the neural network of FIG. 3, and the data card generation infrastructure 410 of FIG. 4.

In operation 710, the dataset analysis module 220 or the data type identification module 430 analyzes a plurality of files of a dataset to determine a primary data type of the dataset. For example, the plurality of files may comprise image files organized in a directory structure and documentation files. The file types of the image files may be determined and the image type for the largest number of files used as the primary data type of the dataset. As another example, documentation files may be searched for predetermined keywords or phrases (e.g., "data type") and nearby values used as an indication of the primary data type of the primary data type (e.g., the string "data type: image" used to determine that the primary data type for the dataset is image data).

The dataset analysis module 220 or the evaluation metrics module 445, in operation 720, determines one or more statistical values for the dataset. For example, the precision, recall, or accuracy may be determined from the documentation for the dataset. Alternatively or additionally, the statistical values may be determined from the data for the dataset. For example, if the dataset comprises sentences, the mean and median number of words in each sentence, the standard deviation of the number of words in each sentence, and other statistical values may be determined from the sentences of the dataset.

In operation 730, the dataset analysis module 220 or the language information module 440 determines a percentage of the dataset that comprises text in each of a plurality of languages. For example, each space-separated sequence of characters may be treated as a word. Each word may be looked up in a plurality of dictionaries for different languages. If the word is found in the dictionary for a language, the word is determined to be in the language.

Based on the determined percentages, the dataset analysis module 220 or the language information module 440 determines the primary language of the dataset (operation 740). For example, the language for which the greatest percentage of words are found in the corresponding dictionary may be the primary language of the dataset. In example embodiments in which the text is processed line-by-line, the determination of the primary language of the dataset may include splitting each of a plurality of files of the dataset into lines, determining a language for each line, and determining the percentage of lines in each of the plurality of languages.

In operation 750, the data card generation infrastructure 410 or the data card generation server 140 stores an indication of the primary data type and at least a subset of the one or more statistical values in a data structure (e.g., one or more rows in one or more tables of a relational database, a JSON or XML file, or any suitable combination thereof). The data card generation infrastructure 410 or the data card generation server 140 also stores an indication of the primary language for the dataset (operation 760).

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: analyzing, by one or more processors, a plurality of files of a dataset to determine a primary data type of the dataset; determining, by the one or more processors, one or more statistical values for the dataset; and storing, in a data structure, an indication of the primary data type and at least a subset of the one or more statistical values.

In Example 2, the subject matter of Example 1 includes determining, by one or more processors, a number of entries in a dataset; accessing, by the one or more processors, a data value representing the number of entries; and based on comparing, by the one or more processors, the determined number of entries with the data value, storing the data value in the data structure.

In Example 3, the subject matter of Examples 1-2 includes determining, by the one or more processors, a percentage of the dataset that comprises text in each of a plurality of languages; based on the determined percentages, determining a primary language of the dataset; and storing, in the data structure, an indication of the primary language.

In Example 4, the subject matter of Example 3 includes wherein the determining of the percentage of the dataset that comprises text in each of the plurality of languages comprises: splitting each of the plurality of files of the dataset into lines; for each line, determining a language; and determining the percentage of lines in each of the plurality of languages.

In Example 5, the subject matter of Examples 1-4 includes determining, by the one or more processors, a first subset of the dataset to be used for training; determining, by the one or more processors, a second subset of the dataset to be used for validation; and storing, in the data structure, an indication of the first subset and an indication of the second subset.

In Example 6, the subject matter of Examples 1-5 includes determining, based on one or more documentation files for the dataset, a license that governs use of the dataset; and storing, in the data structure, an indication of the license.

In Example 7, the subject matter of Examples 1-6 includes wherein the primary data type is at least one of an image, text, audio, and video.

In Example 8, the subject matter of Examples 1-7 includes wherein the analyzing of the plurality of files to determine the primary data type comprises: determining a file type for each of the plurality of files; and for each file type, determining a total size for the files of the file type.

Example 9 is a system comprising: a memory that stores instructions; and one or more processors configured by the instructions to perform operations comprising: analyzing a plurality of files of a dataset to determine a primary data type of the dataset; determining one or more statistical values for the dataset; and storing, in a data structure, an indication of the primary data type and at least a subset of the one or more statistical values.

In Example 10, the subject matter of Example 9 includes wherein the operations further comprise: determining a number of entries in a dataset; accessing a data value representing the number of entries; and based on comparing the determined number of entries with the data value, storing the data value in the data structure.

In Example 11, the subject matter of Examples 9-10 includes wherein the operations further comprise: determining a percentage of the dataset that comprises text in each of a plurality of languages; based on the determined percentages, determining a primary language of the dataset; and storing, in the data structure, an indication of the primary language.

In Example 12, the subject matter of Example 11 includes wherein the determining of the percentage of the dataset that comprises text in each of the plurality of languages comprises: splitting each of the plurality of files of the dataset into lines; for each line, determining a language; and determining the percentage of lines in each of the plurality of languages.

In Example 13, the subject matter of Examples 9-12 includes wherein the operations further comprise: determining, by the one or more processors, a first subset of the dataset to be used for training; determining, by the one or more processors, a second subset of the dataset to be used for validation; and storing, in the data structure, an indication of the first subset and an indication of the second subset.

In Example 14, the subject matter of Examples 9-13 includes wherein the operations further comprise: determining, based on one or more documentation files for the dataset, a license that governs use of the dataset; and storing, in the data structure, an indication of the license.

In Example 15, the subject matter of Examples 9-14 includes wherein the primary data type is at least one of an image, text, audio, and video.

In Example 16, the subject matter of Examples 9-15 includes wherein the analyzing of the plurality of files to determine the primary data type comprises: determining a file type for each of the plurality of files; and for each file type, determining a total size for the files of the file type.

Example 17 is a non-transitory computer-readable medium that stores instructions that, when executed by one or more processors, cause the one or more processors to perform operations comprising: analyzing a plurality of files of a dataset to determine a primary data type of the dataset; determining one or more statistical values for the dataset; and storing, in a data structure, an indication of the primary data type and at least a subset of the one or more statistical values.

In Example 18, the subject matter of Example 17 includes wherein the operations further comprise: determining a number of entries in a dataset; accessing a data value representing the number of entries; and based on comparing the determined number of entries with the data value, storing the data value in the data structure.

In Example 19, the subject matter of Examples 17-18 includes wherein the operations further comprise: determining a percentage of the dataset that comprises text in each of a plurality of languages; based on the determined percentages, determining a primary language of the dataset; and storing, in the data structure, an indication of the primary language.

In Example 20, the subject matter of Example 19 includes wherein the determining of the percentage of the dataset that comprises text in each of the plurality of languages comprises: splitting each of the plurality of files of the dataset into lines; for each line, determining a language; and determining the percentage of lines in each of the plurality of languages.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
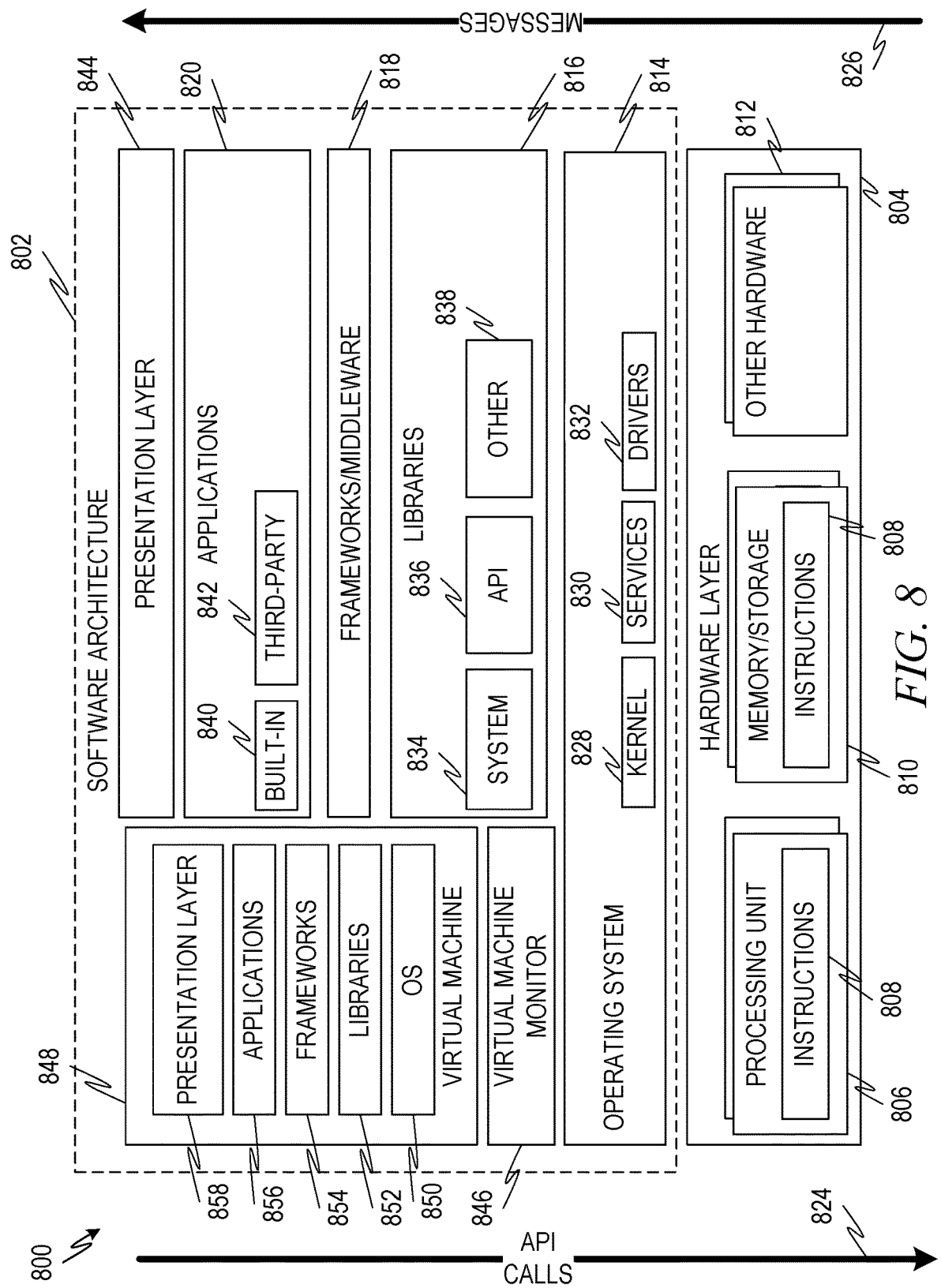
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein. The hardware layer 804 may also include memory and/or storage modules 810, which also have executable instructions 808. Hardware layer 804 may also comprise other hardware as indicated by other hardware 812, which represents any other hardware of the hardware layer 804, such as the other hardware illustrated as part of the software architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, Advanced Audio Coding (AAC), Adaptive Multi-Rate Algebraic Code-Excited Linear Prediction (ACELP) Codec (AMR), JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 may provide a higher-level common infrastructure that may be utilized by the applications 820 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be utilized by the applications 820 and/or other software components/ modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system libraries 834, API libraries 836, and other libraries 838), frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856, and/or presentation layer 858. These layers of software architecture executing within the virtual machine 848 can be the same as corresponding layers previously described or may be different.

Modules, Components And Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 9:
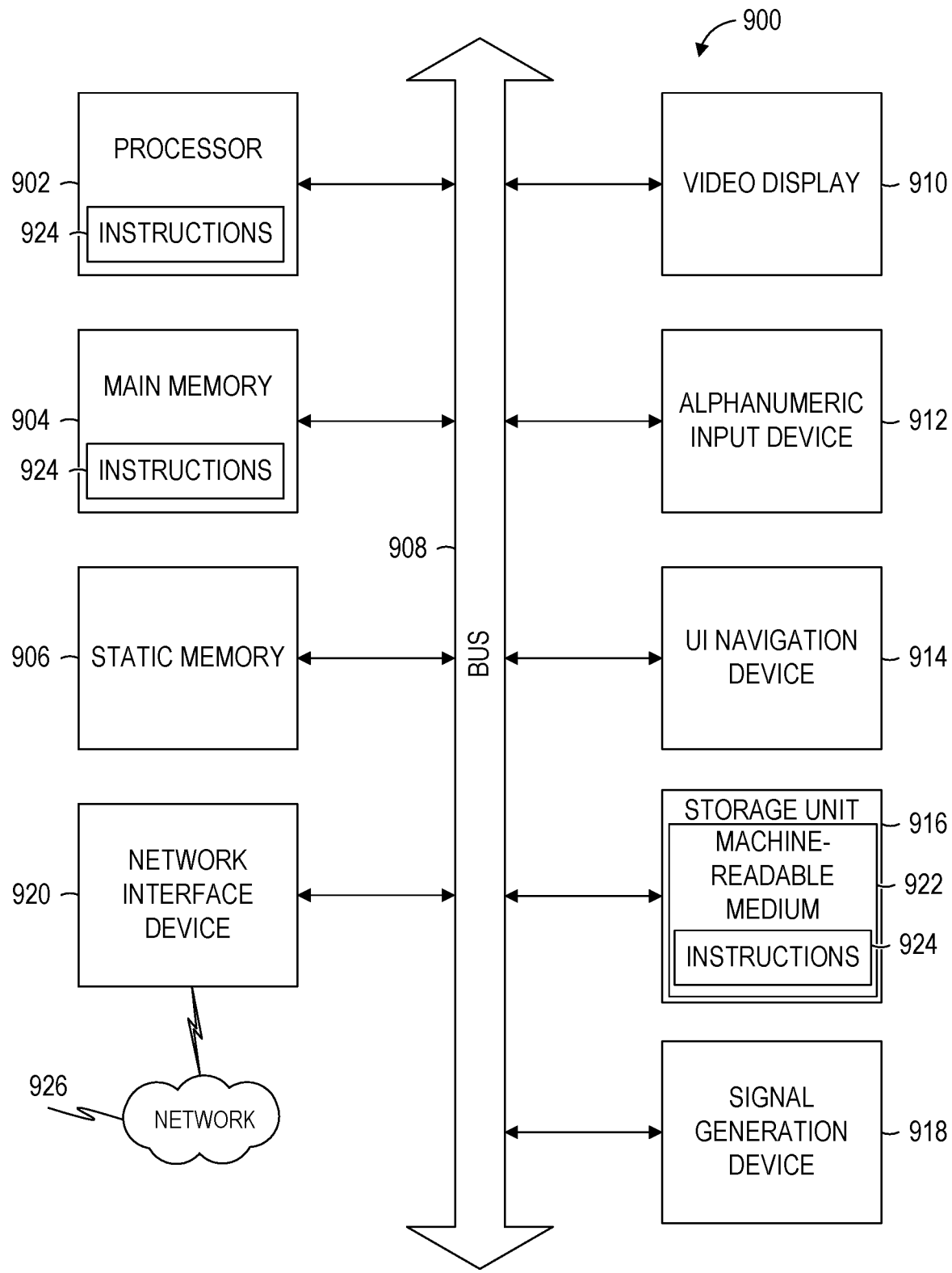
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface navigation (or cursor control) device 914 (e.g., a mouse), a storage unit 916, a signal generation device 918 (e.g., a speaker), and a network interface device 920.

Machine-Readable Medium

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in FIG. 9 to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include nonvolatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
analyzing, by one or more processors, a plurality of files of a dataset to determine a primary data type of the dataset;
determining, by the one or more processors, one or more statistical values for the dataset;
determining, by the one or more processors, a count of entries in the dataset;

accessing, by the one or more processors, a data value representing a stored count of the entries;
based on comparing, by the one or more processors, the determined count of the entries with the data value, storing the data value in a data structure;
determining, by the one or more processors, a percentage of the dataset that comprises text in each of a plurality of languages, by performing operations comprising:
  splitting each of the plurality of files of the dataset into lines;
  for each line, determining a language; and
  determining a percentage of lines in each of the plurality of languages;
based on the determined percentages, determining a primary language of the dataset;
storing, in the data structure, an indication of the primary data type and at least a subset of the one or more statistical values and an indication of the primary language;
determining, by the one or more processors, a first subset of the dataset to be used for training;
determining, by the one or more processors, a second subset of the dataset to be used for validation;
storing, in the data structure, an indication of the first subset and an indication of the second subset;
iteratively generating additional data structures for a set of additional datasets;
receiving, via a user interface, user input to select a set of search criteria, wherein the set of search criteria comprises the primary data type, the count of entries, and the primary language;
based on the set of search criteria and the data structure, displaying information for the dataset in the user interface, the displayed information including the primary data type, the count of entries, and the primary language; and
based on a selection of the dataset by the user, training a neural network using the first subset of the dataset.

2. The method of claim 1, further comprising:
determining, based on one or more documentation files for the dataset, a license that governs use of the dataset; and
storing, in the data structure, an indication of the license.

3. The method of claim 1, wherein the primary data type is at least one of an image, text, audio, and video.

4. The method of claim 1, wherein the analyzing of the plurality of files to determine the primary data type comprises:
determining a file type for each of the plurality of files; and
for each file type, determining a total size for the files of the file type.

5. The method of claim 1, wherein the determining of the first subset is based on contents of a first file and the determining of the second subset is based on contents of a second file.

6. The method of claim 1, wherein the determining of the first subset and the second subset are based on searching for one or more keywords in one or more documentation files for the dataset.

7. A system comprising:
a memory that stores instructions; and
one or more processors configured by the instructions to perform operations comprising:
  analyzing a plurality of files of a dataset to determine a primary data type of the dataset;
  determining one or more statistical values for the dataset;
  determining a count of entries in the dataset;
  accessing a data value representing a stored count of the entries:
    based on comparing the determined count of the entries with the data value, storing the data value in a data structure;
  determining a percentage of the dataset that comprises text in each of a plurality of languages, by performing operations comprising:
    splitting each of the plurality of files of the dataset into lines;
    for each line, determining a language; and
    determining a percentage of lines in each of the plurality of languages;
  based on the determined percentages, determining a primary language of the dataset;
  storing, in the data structure, an indication of the primary data type and at least a subset of the one or more statistical values and an indication of the primary language;
  determining, by the one or more processors, a first subset of the dataset to be used for training;
  determining, by the one or more processors, a second subset of the dataset to be used for validation;
  storing, in the data structure, an indication of the first subset and an indication of the second subset;
  iteratively generating additional data structures for a set of additional datasets;
  receiving, via a user interface, user input to select a set of search criteria, wherein the set of search criteria comprises the primary data type, the count of entries, and the primary language;
  based on the set of search criteria and the data structure, displaying information for the dataset in the user interface, the displayed information including the primary data type, the count of entries, and the primary language; and
  based on a selection of the dataset by the user, training a neural network using the first subset of the dataset.

8. The system of claim 7, wherein the operations further comprise:
determining, based on one or more documentation files for the dataset, a license that governs use of the dataset; and
storing, in the data structure, an indication of the license.

9. The system of claim 7, wherein the primary data type is at least one of an image, text, audio, and video.

10. The system of claim 7, wherein the analyzing of the plurality of files to determine the primary data type comprises:
determining a file type for each of the plurality of files; and
for each file type, determining a total size for the files of the file type.

11. The system of claim 7, wherein the determining of the first subset is based on contents of a first file and the determining of the second subset is based on contents of a second file.

12. The system of claim 7, wherein the determining of the first subset and the second subset are based on searching for one or more keywords in one or more documentation files for the dataset.

13. A non-transitory computer-readable medium that stores instructions that, when executed by one or more processors, cause the one or more processors to perform operations comprising:
- analyzing a plurality of files of a dataset to determine a primary data type of the dataset;
- determining one or more statistical values for the dataset;
- determining a count of entries in the dataset;
- accessing a data value representing a stored count of the entries;
- based on comparing the determined count of the entries with the data value, storing the data value in a data structure;
- determining a percentage of the dataset that comprises text in each of a plurality of languages, by performing operations comprising:
  - splitting each of the plurality of files of the dataset into lines;
  - for each line, determining a language; and
  - determining a percentage of lines in each of the plurality of languages;
- based on the determined percentages, determining a primary language of the dataset;
- storing, in the data structure, an indication of the primary data type and at least a subset of the one or more statistical values and an indication of the primary language;
- determining, by the one or more processors, a first subset of the dataset to be used for training;
- determining, by the one or more processors, a second subset of the dataset to be used for validation;
- storing, in the data structure, an indication of the first subset and an indication of the second subset;
- iteratively generating additional data structures for a set of additional datasets;
- receiving, via a user interface, user input to select a set of search criteria, wherein the set of search criteria comprises the primary data type, the count of entries, and the primary language;
- based on the set of search criteria and the data structure, displaying information for the dataset in the user interface, the displayed information including the primary data type, the count of entries, and the primary language; and
- based on a selection of the dataset by the user, training a neural network using the first subset of the dataset.

14. The non-transitory computer-readable medium of claim 13, wherein the operations further comprise:
- determining, based on one or more documentation files for the dataset, a license that governs use of the dataset; and
- storing, in the data structure, an indication of the license.

15. The non-transitory computer-readable medium of claim 13, wherein the primary data type is at least one of an image, text, audio, and video.

16. The non-transitory computer-readable medium of claim 13, wherein the analyzing of the plurality of files to determine the primary data type comprises:
- determining a file type for each of the plurality of files; and
- for each file type, determining a total size for the files of the file type.

17. The non-transitory computer-readable medium of claim 13, wherein the determining of the first subset is based on contents of a first file and the determining of the second subset is based on contents of a second file.

* * * * *